United States Patent [19]
Anderson

[11] 4,396,282
[45] Aug. 2, 1983

[54] DISC FILM HOLDER FOR PHOTOGRAPHIC PRINTER

[75] Inventor: Richard D. Anderson, Maple Grove, Minn.

[73] Assignee: Pako Corporation, Minneapolis, Minn.

[21] Appl. No.: 349,928

[22] Filed: Feb. 18, 1982

[51] Int. Cl.³ .............................................. G03B 17/62
[52] U.S. Cl. ....................................... 355/76; 353/25; 353/110; 354/275; 355/53; 355/64
[58] Field of Search ....................... 355/75, 76, 53, 64; 354/121, 275; 353/25, 110; 430/496

[56] References Cited

U.S. PATENT DOCUMENTS

| | | | |
|---|---|---|---|
| 3,873,194 | 3/1975 | Schwartz | 353/110 |
| 4,132,469 | 1/1979 | Harvey | 353/25 |
| 4,194,822 | 3/1980 | Sethi | 354/121 |
| 4,203,733 | 5/1980 | Clifton et al. | 355/64 |
| 4,204,733 | 5/1980 | Modney et al. | 355/64 |
| 4,208,116 | 6/1980 | Morse | 354/275 |
| 4,208,117 | 6/1980 | Harvey et al. | 354/275 |
| 4,212,673 | 7/1980 | Sethi et al. | 430/496 |
| 4,255,034 | 3/1981 | Harvey et al. | 354/121 |
| 4,264,169 | 4/1981 | Harvey | 354/121 |
| 4,268,145 | 5/1981 | Harvey et al. | 354/121 |

OTHER PUBLICATIONS

Research Disclosure, Aug. 1978, Nos. 17287, 17289, 1978 Industrial Opportunities Ltd., Homewell, Havant, Hampshire, United Kingdom.

Primary Examiner—Richard A. Wintercorn
Attorney, Agent, or Firm—Kinney, Lange, Braddock, Westman and Fairbairn

[57] ABSTRACT

A disc film holder holds a generally disc-like photographic film unit having a plurality of image frames and indexes and disc-like photographic film unit to position selected image frames at a predetermined position, such as a print gate aperture in a photographic printer. The disc-like film unit is held coaxially about a central post and is rotationally indexed about a central axis. When the film unit is rotated for indexing a selected image frame to the print gate aperture, the film unit is biased upwardly to an indexing position so that both the top and bottom surfaces of the film is maintained out of contact with any surface during rotation. When the disc has been indexed so that the selected image is in alignment with the print gate aperture, the film unit is forced downwardly to a non-indexing position and the frame to be printed is clamped at the print gate aperture for transferring an image to photographic print paper.

20 Claims, 6 Drawing Figures

DISC FILM HOLDER FOR PHOTOGRAPHIC PRINTER

CROSS-REFERENCE TO COPENDING APPLICATIONS

Reference is hereby made to the following copending applications filed on even date herewith and assigned to the same assignee: "Disc Film Advance Assembly" (Ser. No. 349926); "Disc Film Frame Position Indicator" (Ser. No. 349927); "Neghold Assembly" (Ser. No. 349929); and "Photographic Film Cleaner" (Ser. No. 349930).

BACKGROUND OF THE INVENTION

1. Field of the Invention

The present invention relates to apparatus for holding a disc-like photographic film unit while selected image frames of the photographic film unit are rotationally indexed to a predetermined position. In particular, the present invention relates to such an apparatus for positioning disc-like film units in a photographic printer.

2. Description of the Prior Art

Apparatus for holding and indexing conventional strip film on a photographic printer so that selected image frames are positioned at a print gate for transfer of the image to photographic print paper are well known in the art. However, this type of apparatus is wholly unsuited for positioning selected image frames of a disc-like film unit at a print gate wherein the individual image frames are located circumferentially about a central hub. Examples of a disc film unit are disclosed in the following U.S. patents:

| Inventor | U.S. Pat. No. |
|---|---|
| Sethi | 4,194,822 |
| Morse | 4,208,116 |
| Harvey et al | 4,208,117 |
| Sethi et al | 4,212,673 |
| Harvey et al | 4,255,034 |
| Harvey | 4,264,169 |
| Harvey et al | 4,268,145 |

A print gate indexing device for a disc-like film unit is disclosed in Research Disclosure of August, 1978, Disclosure No. 17287. Using the print gate indexing device, each image frame is manually advanced into the print gate. The disc-like film unit is held in a single horizontal plane while selected image frames are rotationally indexed to the print gate. However, the selected individual image frames are not necessarily optically centered or in proper focal range due to tolerance differences that may occur from individual disc-like film unit to film unit. These tolerances may be found in the hub or film containing the image frames, such as the thickness, or in the center hole and keyway in the hub which engage a center post and key that hold the film unit in a fixed angular position with respect to the indexing device.

A rotational positioning device is also disclosed in Research Disclosure of August, 1978, Disclosure No. 17289. The rotational positioning device includes an assembly from which a central shaft extends upwardly for coaxially centering the disc-like film unit on the assembly. A pair of pins also extend upwardly from the assembly for extending through cooperating apertures in the hub of the disc film unit. However, the disc film unit is not held in a manner so that a selected image frame is ensured of optical centering and proper focusing.

The Clifton et al U.S. Pat. No. 4,203,664 and the Modney et al U.S. Pat. No. 4,204,733 show film positioning apparatus which provide support and positioning of a disc-like film unit. Again, the apparatus that rotationally indexes the disc film unit for positioning images for printing in a printing gate aperture does not ensure that the particular image is optically centered or in exact focus.

SUMMARY OF THE INVENTION

The present invention includes an apparatus that holds a generally circular photographic film unit having a plurality of image frames and indexes the film unit to position selected image frames at a predetermined position, such as a print gate aperture. The apparatus holds the film unit such that proper focusing and optical centering of the image is ensured. The apparatus includes holding the generally circular film unit about a central axis for rotational indexing about the central axis. The film unit is biased upwardly during rotational indexing of a selected image frame to the predetermined position. When the selected image frame is indexed to the predetermined position, the film unit is forced downwardly against the upward bias for positioning the selected image to a proper focusing position.

DETAILED DESCRIPTION OF THE PREFERRED EMBODIMENTS

Figure 1:
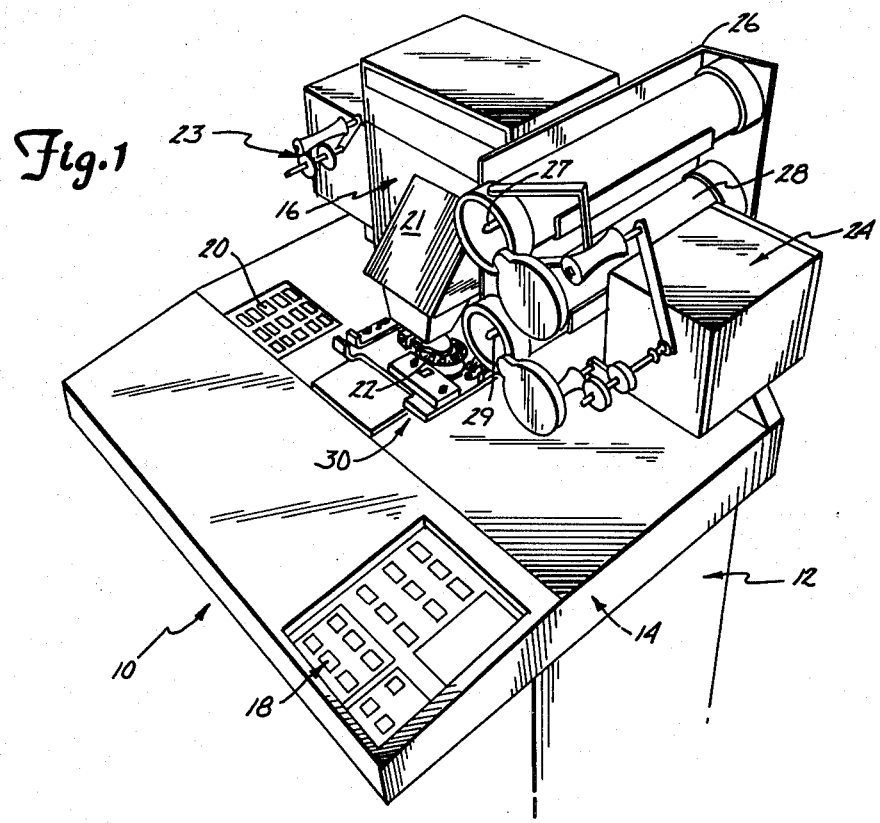
FIG. 1 is a perspective view of a photographic printer with a disc film holder of the present invention.

Photographic printers in general are well known; a typical printer, generally indicated at 10, is illustrated in FIG. 1. The printer 10 is more fully described in the Harvey U.S. Pat. No. 4,235,551 and the Baert U.S. Pat. No. 4,175,852, both patents being assigned to the same assignee as the present application. Briefly, the printer includes a light-tight cabinet 12, a console 14 which is mounted on top of the cabinet 12, and a lamphouse 16 mounted on the console 14. The console 14 includes a pair of panels, control panel 18 and keyboard 20, which contain various switches and keys to control and initiate various functions of the printer operation.

Lamphouse 16 contains print lamps (not shown) which provide high intensity light. The light is directed downwardly by means of drop cone assembly 21 in an essentially uniform light distribution. The light passes through a frame of a disc-like photographic film unit 22 which is clamped at a print gate aperture and passes downwardly into cabinet 12. The light is imaged by optics contained within cabinet 12 onto a selected portion of a web of photosensitive print paper (not shown) within cabinet 12.

The printer 10, briefly described above, has been used in the past exclusively for transferring images from strip-type film, as indicated by a film supply assembly 23 and a film take up assembly 24. Rolls of the strip-type film are placed on the film supply assembly 23 and run along the top of the console 14 and onto the film take up assembly 24. However, this type of arrangement is wholly unsuitable for printing images from disc-like film units having a plurality of image frames positioned in a generally circular arrangement (the disc-like film units are described subsequently).

To accommodate the disc-like film units in the above-mentioned printer, and other similar printers, the apparatus of the present invention has been provided. Included on the printer are at least two tube-like members 26, 28. A first tube-like member 26 includes a plurality of disc film units mounted on a spindle 27 which have been developed by a suitable photographic developing process awaiting transfer of their images onto print paper. A second tube-like member 28 contains disc film units mounted on a spindle 29 whose images have been transferred to and printed on print paper. A disc film unit is taken from the first tube-like member 26 and placed on the printer whereupon selected images are exposed on the photosensitive print paper (not shown). After all the selected images are printed on the print paper (not shown), the disc film unit is then placed in the second tube-like member 28.

Figure 2:
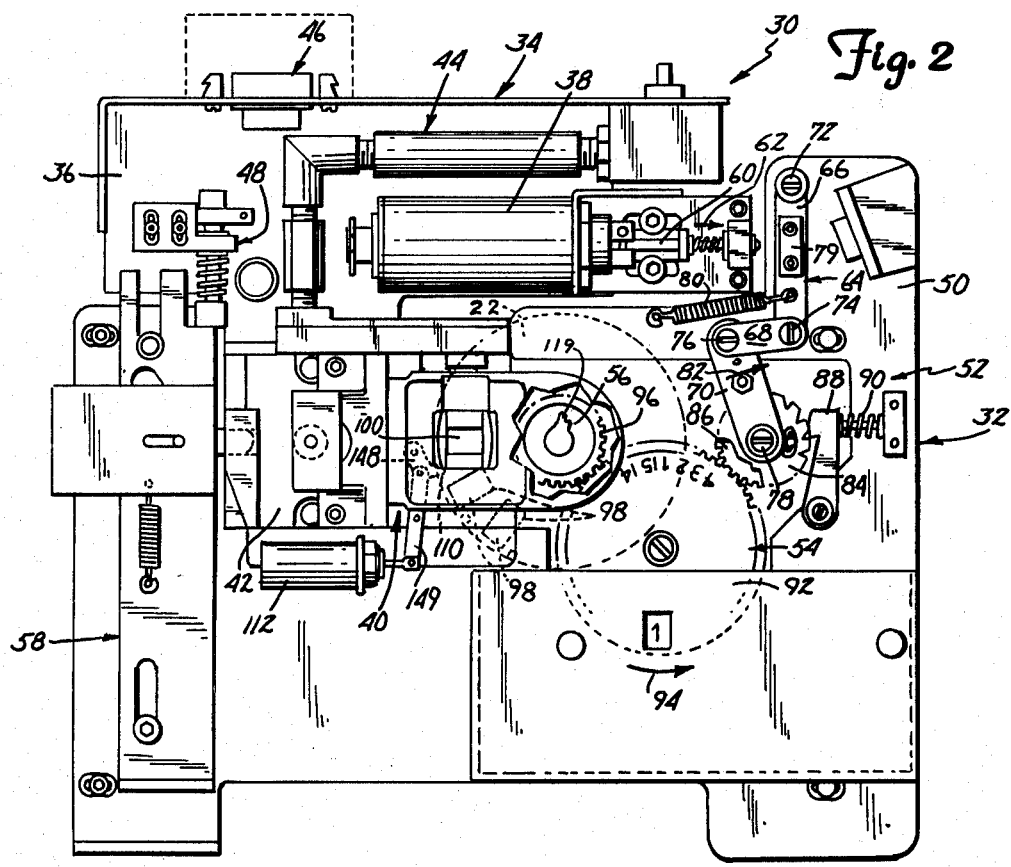
FIG. 2 is a top plan view of a film gate assembly and film advance assembly having the disc film frame positioner of the present invention.

The disc-like film units 22 and individual image frames are indexed to a print gate under the drop cone 21 by a neghold assembly 30, as more fully illustrated in FIG. 2. The neghold assembly 30 includes a movable film transport assembly 32 and a stationary film gate assembly 34. The film transport assembly 32 is movable in a generally horizontal plane along a pair of horizontal rails (not shown) from a position under drop cone 21, as shown in FIG. 1 to a position closer to the front of console 14. This allows the operator to remove a film disc unit 22 from the transport assembly 32 after printing, to place the completed disc on the spindle 29 within the takeup tube 28, to remove the next disc film 22 from the spindle 27 of the supply tube 26, and to place the next disc film 22 on the transport assembly 32. The transport assembly 32 is then pushed back into its normal operating position with the film disc 22 positioned with one frame at the print gate below drop cone 21. FIG. 2 shows the neghold assembly 30 with the film transport assembly 32 in its fully inserted position under the drop cone 21, as shown in FIG. 1.

The film gate assembly 34 includes a film gate assembly main base 36 mounted on the console 14 such that the film gate assembly 34 is optically centered with respect to the photographic printer 10. The film gate assembly includes a film advance solenoid 38, an aperture assembly 40 mounted on an adjustable base 42, an air cleaning assembly 44 for directing air onto the film to clean the film, an electrical connector 46 for electrically connecting the film gate assembly to the photographic printer, and a sensor assembly 48 that provides an electrical signal which indicates when transport assembly 32 is in position for printing.

The film transport assembly 32 includes a slidable base 50 that is slidably attached by rails to the console 14 and the film gate assembly 34. Attaching the film transport assembly to the film gate assembly and the console 14, optically aligns the film advance assembly 32 with the photographic printer. The film transport assembly 32 includes a film advance mechanism 52, a disc film frame position indicator 54, a disc film holder 56, and a latch assembly 58.

The film advance solenoid 38 has a plunger 60 which moves in the general direction of arrow 62 when the solenoid 38 is energized. The plunger 60 engages pivotal linkage 64 of the film advance mechanism 52. The pivotal linkage 64 includes a first pivot arm 66, a second pivot arm 68, and a third pivot arm 70, the pivot arms being pivotally connected to each other at first pivot point 72, second pivot point 74, third pivot point 76, and fourth pivot point 78. The first and fourth pivot points 72 and 78 are fixed pivotal connections while second and third pivot points 74 and 76 are floating pivotal connections. The pivotal linkage further includes a striking block 79 fixedly attached to the first pivot arm 66 by suitable means and a biasing spring 80 attached at one end to the pivot arm 66 and at another end to the slidable base 50. When the plunger 60 engages the striking block 79, motive force from the plunger 60 is directed through the pivotal linkage 64 in a direction of arrow 82.

The third pivot arm 70 is moved in the general direction of arrow 82 and turns an advance ratchet wheel 84 and advance assembly gear 86 of the film advance ratchet assembly 52. A positioning pawl 88 and spring 90 permit the ratchet wheel 84 to move in a reverse direction to eliminate over-rotation and to cooperate with pawl 148 in precisely positioning the frame 98 of disc 22 at print gate 100. The film advance mechanism is described in further detail in the previously-mentioned co-pending patent application entitled "Disc Film Advance Assembly," and that description is hereby incorporated by reference.

A film frame position indicator gear 92 cooperates with the ratchet gear 86 such that the ratchet gear 86 advances the frame position indicator gear 92 in a direction of arrow 94. The film frame position indicator is also described in the previously-mentioned co-pending patent application entitled "Disc Film Frame Position Indicator," and that description is hereby incorporated by reference.

A disc film holder gear 96 in turn cooperates with the frame position indicator gear 92 to position individual film frames 98 at a print gate aperture 100.

Figure 3:
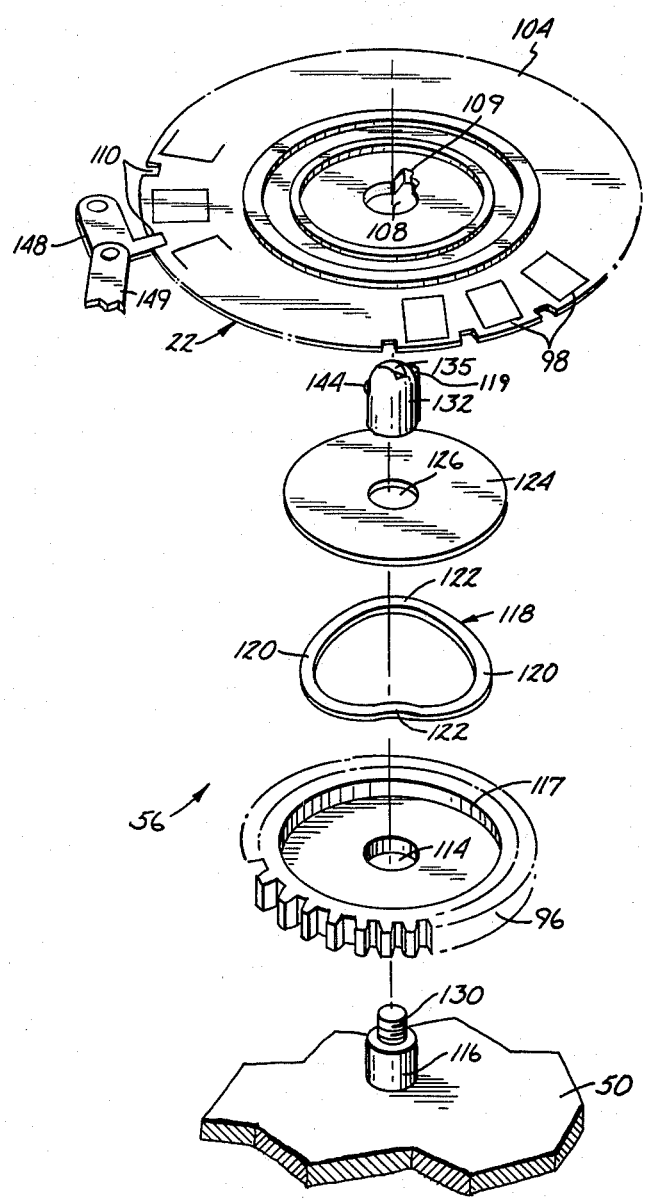
FIG. 3 is an exploded perspective view of the disc film holder and the disc film unit.

As illustrated in FIG. 3, the individual film frames 98 are equally spaced apart in a circumferential manner on the disc-like photographic film unit 22. Examples of the disc-like film unit 22 are disclosed in the patents which were listed in the Description of the Prior Art and which are herein incorporated by reference.

The disc-like film unit has a generally circular photographic film portion 104 and a substantially rigid hub 106. The hub 106 has a central aperture 108 along a rotational axis and a keyway 109. A plurality of slots or notches 110 are positioned on the outer periphery of the film portion 104 spaced between the individual film frames 98. Each notch 110 has a predetermined spatial relationship with one of the frames 98, and thus notches 110 are used for determining the positioning of frames 98 at print gate 100.

The individual frame 98 to be printed must be optically centered and in proper focus when it is indexed to position and clamped at the print gate 100. There are several problems unique to a disc film unit that are quite different from strip-type film. Unlike strip-type film which is easily manipulated and clamped for proper focusing in an upward or downward direction due to inherent characteristics of a web, the film portion 104 of the disc film unit is not easily manipulated due to the rigid hub 106. In addition, the generally circular nature of the disc film unit poses different problems in placing each frame 98 in proper focus at the print gate 100.

The disc film unit 22 also poses problems in optically centering the initial film frame at the print gate aperture and subsequent film frames on the same film unit due to tolerance variations from film unit to film unit in the rigid hub 106. For example, tolerance variations in the diameter of the central aperture 108 and keyway 109 pose problems in optically centering each selected image frame of a single disc-like film unit since the film unit is not held in a secure manner in the angular direction.

The disc film holder of the present invention substantially eliminates the above problems. The disc film holder indexes each film frame to a proper focus position at the print gate aperture. In addition, the disc film holder securely retains the disc film unit in an angular direction so that tolerance variations in the central aperture 108 and keyway 109 are substantially eliminated.

The disc film holder 56 includes the positioning gear 96. The gear 96 includes a central aperture 114 coaxial with the rotational axis. A center rotational post 116 with a key 119 is permanently mounted onto the base 50 of the film transport assembly 32. The post 116 defines the rotational axis and extends through the central aperture 114 thereby positioning the gear 96 about the rotational axis.

The gear 96 has a recess 117. A circular spring washer 118 is positioned within the recess 117. Spring washer 118 has opposite facing lower portions 120 and opposite facing upper portions 122 such that an upward biasing force is produced by the spring washer. In one working embodiment, the spring washer was set into a recess having a depth of 0.015 inches with the lower portions 120 contacting the bottom surface of the recess and the upper portions 122 approaching a top edge of the recess.

Figure 4:
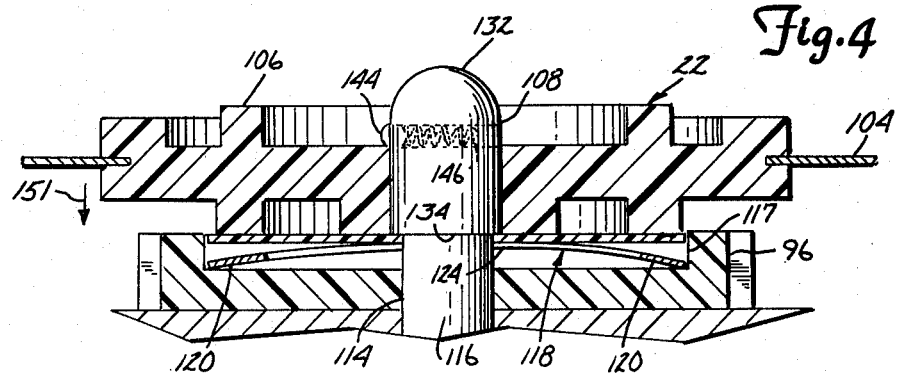
FIG. 4 is a cross sectional view of the disc film holder with the disc film unit with portions shown whole for purposes of clarity.

A stripper washer 124 has a central aperture 126 and rests on the upper portions 122 of the spring washer 120 within the recess 117, as illustrated in FIG. 4.

The center post 116 has an upper threaded portion 130. A center post cap 132 threadably engages the upper threaded portion 130 retaining the stripper washer 124 with a shoulder 134 against the spring washer 118. A slot 135 located on an upper side of the cap 132 facilitates the threaded engagement of the cap 132 to the threaded portion 130 by a tool such as a screwdriver.

The cap 132 has a ball plunger 144 positioned in a passage substantially perpendicular to the axis of rotation. The ball plunger 144 is biased outwardly by a spring 146 such that the ball plunger is movable within the passage in the cap 132 past an outer surface thereof.

A film engaging pawl 148 engages one of the notches 110 of the disc film unit 22 with a free end to precisely locate the frame 98 associated with that notch 110 in the print gate 100. The pawl 148 is actuated selectively to engage and disengage the notches 110 by a suitable electrically actuated solenoid 112 through pivoted linkage 149. Thus in the embodiment shown, pawl 148 is positively withdrawn from one notch 110 at the beginning of film indexing, and is positively driven into engagement with another notch 110 at the end of indexing. Alternatively, the pawl 148 is spring biased against the outer periphery of the film portion 104 to engage the notches 110.

The film unit 22 is positioned on the disc film holder 56 with the post 116 extending through the central aperture 108 and the key 119 extending through the keyway 109. The hub 106 of the film unit 22 rests on the stripper washer 124.

Figure 5:
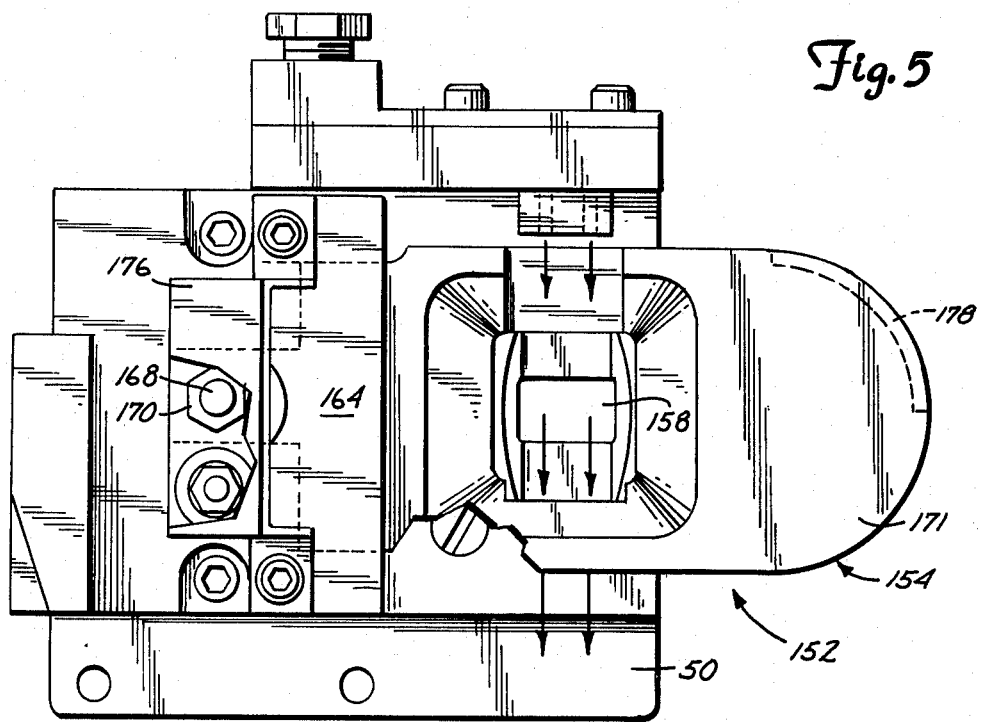
FIG. 5 is a top view of an aperture assembly for clamping the disc film unit.
Figure 6:
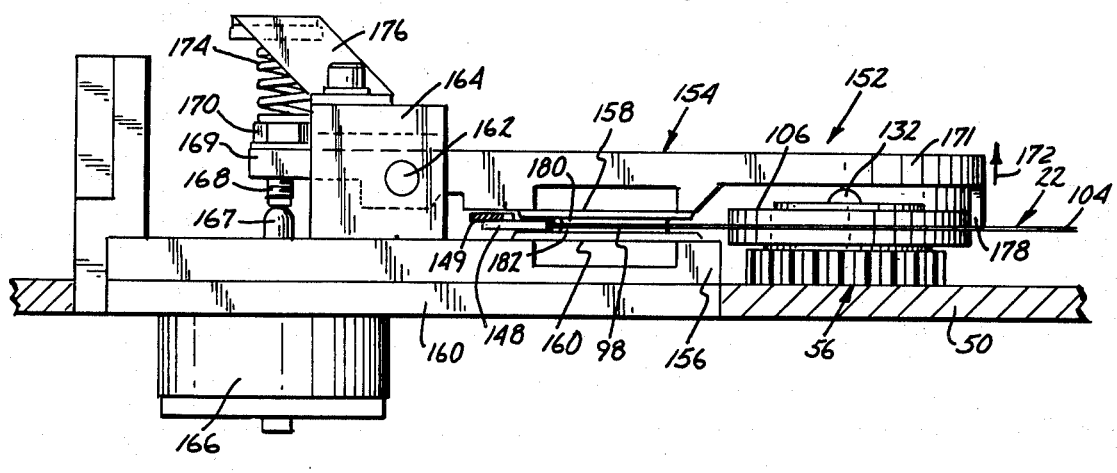
FIG. 6 is a side view of the aperture assembly clamping the disc film unit.

An aperture assembly 152 is shown in FIGS. 5-6. The aperture assembly includes a top clamp having a top aperture plate 154 and a bottom base plate 156. The aperture assembly 152 clamps the selected film frame 98 of the disc 22 between the top and bottom surface plates 154, 156.

As best shown in FIG. 6, the top aperture plate 154 and the bottom aperture plate 156 have light transmitting apertures 158, 160, respectively, which are aligned when the top aperture plate 154 is in a clamped position during a print exposure cycle. The disc film 22, as shown in FIG. 6, is held in a clamped position between the top and bottom aperture plates 154, 156 during printing.

The bottom aperture plate 156 is fixedly attached to a base 160 of the film gate assembly 34. The top aperture plate 154, on the other hand, is attached to the pivot shaft 162, which is supported at each end by support 164, as best illustrated in FIGS. 5 and 6. The pivot shaft 162 and the top aperture plate 154 are pivoted about a pivot axis defined by the pivot shaft 162.

The position of the top aperture plate 154 is controlled by a film clamp solenoid 166, which is mounted below the base 160, and has the upper end of a plunger 167 extending upwardly to engage a lower end of a solenoid adjustment screw 168. The adjustment screw 166 is positioned at one end 169 of the top aperture plate 154 and extends through a screw threaded aperture (not shown). A nut and washer 170 hold the adjusting screw 168 in a selected position in order to provide a desired amount of clamping force when the plunger 167 is in its uppermost position.

A bias force tending to push the end 169 of the top aperture plate 154 downward and thus bias aperture plate 154 to an open position in the general direction of arrow 172 when the solenoid 166 is not actuated is provided by a bias compression spring 174. A retainer 176 is mounted on the support 164 and extends above the end 169 of the top aperture plate 154 so that the bias spring 174 is held between the retainer 176 and the top end of the adjusting screw 168.

When the solenoid 166 is actuated, the plunger 167 is driven upward, which tips the end 169 of the aperture plate upward and pivots an opposite end 171 of the aperture plate 154 downward to clamp film 22 between the top aperture plate 154 and the bottom aperture plate 156. When the solenoid 166 is de-energized, the plunger 166 moves downwardly, and the bias spring 174 pushes the end of the aperture plate 154 downwardly. This causes the film 22 to be unclamped whenever the solenoid 166 is de-energized. This type of film clamping arrangement is described in further detail in U.S. Pat. No. 4,313,677 by Stewart, which is assigned to the same assignee as the present application.

The upper aperture plate 154 has a film engaging shoulder 178 extending downwardly therefrom and positioned to engage the film portion 104 of the disc film unit proximate the hub 106. The shoulder 178 engages the film portion 104 when the aperture assembly is in a clamped position. The shoulder portion is arcuately shaped to engage the film portion 104 proximate the hub (i.e. without touching frames 98), and preferably extends approximately one-quarter of the periphery of the hub. Shoulder 178 applies force on the opposite side of hub 106 from where clamping force is applied by top plate 154 onto frame 98. This prevents tipping of disc unit 98 on post 132 during clamping.

The top aperture plate 154 and the bottom aperture plate 156, each have a ridge 180, 182 positioned along the periphery of apertures 158, 160, respectively. The ridge 182 defines the proper focal plane for positioning the film frame. When the top aperture plate 154 is in a clamping position, the ridges 180, 182 clamp the film surrounding the individual film frame 98, ensuring that the individual film frame 98 is in a flat plane and in proper focus.

In operation, the disc film unit 22 is placed in the disc film holder 56 with the central post 160 and cap 132 extending through the central aperture 108 of the film unit. As the cap 132 extends through the aperture 109, the ball plunger 144 is pushed inwardly. When the disc film unit is in position against the stripper washer 124, the ball plunger 144 is biased outwardly extending past the outer surface of the cap 132 and holding the disc film unit 22 against the stripper washer 124. The ball plunger 144, therefore, limits the upward movement of the disc film unit 22 when film unit 22 is unclamped. The key 119 cooperates with the keyway 109 of the film unit to hold the film unit 22 from angular rotation.

The disc film unit 22 is rotated about a central axis, positioning selected film frames 98 at the print gate aperture under the drop cone 21 by the operation of the advance solenoid 38, advance mechanism 52 and the various gears transferring motive force to the disc film holder 56. When a selected film frame 98 is positioned at the print gate aperture 100, the top aperture plate 154 is pivoted downwardly, clamping the selected film frame between the ridges 180 and 182 and engaging the film portion 104 with the shoulder 178. When in the clamping position, the top aperture plate 154 causes the hub 106 to be pushed downwardly against the stripper washer 124 and overcomes the biasing force of the spring washer 118. When the film unit 22 is clamped, the selected film frame 98 is automatically in the proper focal plane.

After the print exposure has been made, the top aperture plate 154 pivots upwardly, releasing the disc film unit 22 and the film unit 22 rises in a direction opposite to arrow 154 due to the biasing force of the spring washer 118, as illustrated in FIG. 4. When the film unit 22 is in the up position, the disc film holder 56 is indexed to position the next selected film frame at the print gate aperture. When a disc film unit is being elevated, the film portion does not touch ridges 180 and 182 or any other part of either the film gate assembly 34 or the film transport assembly 32, preventing any scratching of either the top or bottom surfaces of the film frames 98 of the disc film unit 22 during indexing.

Conclusion

The apparatus of the present invention provides a method for properly positioning a disc film unit on a photographic printer wherein the individual film frames of the disc film unit are optically centered and placed in proper focus automatically. The individual film frames are indexed to the print gate aperture by raising the disc film unit in an upward direction and not permitting the film portion 104 to touch any portion of the neghold assembly as the disc film unit 22 is being indexed.

Although the present invention has been described with reference to preferred embodiments, workers skilled in the art will recognize that changes may be made in form and detail without departing from the spirit and scope of the invention.

What is claimed is:

1. An apparatus for holding a generally circular photographic film unit having a plurality of image frames and angularly indexing the generally circular film unit to position a selected image frame at a predetermined position, the apparatus comprising:
   means for coaxially holding the generally circular film unit about a central axis;
   means for angularly indexing the generally circular film unit about the central axis;
   biasing means for biasing the generally circular film unit in a first direction generally parallel to the central axis to an indexing position during indexing a selected image frame to the predetermined position; and
   means for moving the generally circular film unit in a second direction opposite to the first direction to a non-indexing position after the selected image frame is indexed to the predetermined position.

2. The apparatus of claim 1 wherein the film unit has a central post engaging aperture and a keyway proximate the central post and wherein the means for coaxially holding the generally circular film unit about the central axis includes:
   a rotating base;
   a central post positioned coaxially along the central axis and extending generally upwardly from and fixedly attached to the rotating base; and
   a key for engaging the keyway for retaining the disc film unit in a fixed angular position with respect to the base.

3. The apparatus of claim 2 wherein the biasing means includes:
   spring means positioned on a surface of the rotating base for providing a bias force in the first direction;
   a plate abutting the spring means and positioned to apply bias force to the film unit; and
   means for holding the plate against the spring means.

4. The apparatus of claim 3 wherein the spring means generally surrounds the central post.

5. The apparatus of claim 1 wherein the predetermined position is a print gate of a photographic printer, and wherein the apparatus further comprises aperture means for clamping an image frame of the film unit at the print gate.

6. The apparatus of claim 5 wherein the aperture means comprises:
   a movable aperture plate having a first aperture;
   a stationary aperture plate having a second aperture; and
   means for selectively moving the movable aperture plate between a clamping position in which an image frame of the film unit is clamped between the movable and stationary aperture plates, and a non-clamping position in which the movable aperture plate is spaced from the film unit and the stationary aperture plate.

7. The apparatus of claim 6 wherein the movable aperture plate is the means for moving the generally circular film unit in the second direction, the movable aperture plate moving the film unit in the second direction to the non-indexing position as it moves from the non-clamping position to the clamping position.

8. The apparatus of claim 7 wherein when the movable aperture plate moves from the clamping to the non-clamping position, it permits the biasing means to move the film unit in the first direction from the non-indexing position to the indexing position.

9. The apparatus of claim 8 wherein the biasing means maintains the film unit in the indexing position during angular indexing of the film unit with major surfaces of the image frames of the film unit spaced from and out of contact with the movable and stationary aperture plates.

10. The apparatus of claim 9 wherein the stationary aperture plate has a second film engaging ridge around a periphery of the second aperture defining a focal plane and the movable aperture plate has a first film engaging ridge around a periphery of the first aperture such that when the movable aperture plate moves to the clamping position, the selected image frame is clamped between the first and second ridges and positioned in the proper focal plane.

11. The apparatus of claim 9 wherein the movable aperture plate includes a shoulder for engaging the disc film unit on an opposite side of the central axis from the selected image frame to apply a force to the film unit in the second direction when in the clamping position.

12. An apparatus for holding a generally circular photographic film unit having a plurality of image frames and angularly indexing the generally circular film unit to position a selected image frame at a print gate aperture of a photographic printer, the apparatus comprising:
  means for coaxially holding the generally circular film unit about a central axis;
  means for angularly indexing the generally circular film unit about the central axis;
  biasing means for biasing the generally circular film unit in an upward direction to an indexing position during indexing a selected image frame to the print gate aperture; and
  means for positioning the generally circular film unit in a downward direction to a non-indexing position after the selected image frame is indexed to the print gate aperture.

13. The apparatus of claim 12 wherein the film unit has a central post engaging aperture and a keyway proximate the central post and wherein the means for coaxially holding the generally circular film unit about the central axis includes:
  a rotating base;
  a central post positioned coaxially along the central axis and extending generally upwardly from and fixedly attached to the rotating base; and
  a key for engaging the keyway for retaining the disc film unit in a fixed angular position with respect to the base.

14. The apparatus of claim 13 wherein the biasing means includes:
  spring means positioned on a top surface of the rotating base for applying an upward bias force;
  a top plate abutting upper surfaces of the spring means; and
  means for holding the top plate against upper surfaces of the spring means.

15. The apparatus of claim 12 wherein the means for positioning the generally circular film unit in a downward direction is an upper aperture plate of an aperture assembly defining the print gate aperture.

16. The apparatus of claim 15 wherein the means for positioning further includes a lower stationary aperture plate having a lower print aperture and a film engaging ridge around a periphery of the lower print aperture defining a proper focal plane and the upper aperture plate has an upper right aperture and a film engaging ridge around a periphery of the upper print aperture such that when the upper aperture plate moves downwardly, the selected image frame is clamped and positioned in the proper focal plane.

17. The apparatus of claim 15 wherein the upper aperture plate includes a downwardly extending shoulder for engaging the disc film unit and applying a downward force to the film unit when in a clamping position.

18. An apparatus for indexing a selected image frame of photographic film to a print gate aperture of a photographic printer and clamping the selected image frame at the print gate aperture, the apparatus comprising:
  a movable aperture plate at the print gate having a first aperture;
  a stationary aperture plate at the print gate having a second aperture;
  means for selectively moving a movable aperture plate between a clamping position in which an image frame of the photographic film is clamped at the print gate between the movable unstationary aperture plates with the image plane aligned with the first and second apertures, and a non-clamping position in which the movable aperture plate is spaced from the photographic film and the stationary aperture plate;
  means for indexing the photographic film when the movable aperture plate is in the non-clamping position to index a selected image frame of the photographic film into alignment with the print gate; and
  biasing means for biasing the photographic film to an indexing position in which major surfaces of the image frames of the photographic film are spaced from and out of contact with the movable and stationary aperture plates when the movable aperture plate is in a non-clamping position and the means for indexing the photographic film is indexing the photographic film.

19. The apparatus of claim 18 wherein the photographic film is a generally circular photographic film unit having a plurality of image frames positioned circumferentially about a central axis, and wherein the means for indexing angularly indexes the film unit about the central axis.

20. The apparatus of claim 19 wherein the biasing means biases the film unit in a first direction which is generally parallel to the central axis when the movable aperture plate is in the non-clamping position, and wherein the movable aperture plate applies force to the film unit in a second direction opposite the first direction when the movable aperture plate moves from the non-clamping position to the clamping position.

* * * * *